(12) United States Patent
King

(10) Patent No.: US 9,797,275 B1
(45) Date of Patent: Oct. 24, 2017

(54) MOTORCYCLE ENGINE POWER VALVE CONTROL UPGRADE KIT

(71) Applicant: Timothy B. King, New Woodstock, NY (US)

(72) Inventor: Timothy B. King, New Woodstock, NY (US)

( * ) Notice: Subject to any disclaimer, the term of this patent is extended or adjusted under 35 U.S.C. 154(b) by 0 days.

(21) Appl. No.: 15/173,029

(22) Filed: Jun. 3, 2016

(51) Int. Cl.
| | |
|---|---|
| *F02D 13/08* | (2006.01) |
| *F02B 75/02* | (2006.01) |
| *F01L 1/02* | (2006.01) |
| *F02D 13/02* | (2006.01) |

(52) U.S. Cl.
CPC ............. *F01L 1/02* (2013.01); *F02B 75/02* (2013.01); *F02D 13/0284* (2013.01); *F02B 2075/025* (2013.01); *Y02T 10/18* (2013.01)

(58) Field of Classification Search
CPC .................. F02B 2075/025; F02D 13/0284
USPC ................... 123/65 PE, 65 R, 65 V, 323
See application file for complete search history.

(56) References Cited

U.S. PATENT DOCUMENTS

| | | | | |
|---|---|---|---|---|
| 4,766,854 A | * | 8/1988 | Riese | F02B 25/26 123/65 PE |
| 4,776,305 A | * | 10/1988 | Oike | F01L 1/38 123/323 |
| 5,752,476 A | * | 5/1998 | Nakamura | F02D 13/0284 123/65 PE |
| 6,019,090 A | * | 2/2000 | Ozawa | F02B 61/045 123/198 F |
| 6,021,748 A | * | 2/2000 | Motose | F02B 61/045 123/65 PD |
| 6,253,718 B1 | * | 7/2001 | Uchida | F01L 3/205 123/323 |
| 6,273,036 B1 | * | 8/2001 | Uchida | F02B 75/16 123/65 PE |

FOREIGN PATENT DOCUMENTS

| | | | | |
|---|---|---|---|---|
| JP | 62035020 A | * | 2/1987 | |
| JP | 05141249 A | * | 6/1993 | |
| JP | 05321673 A | * | 12/1993 | |
| JP | 08093482 A | * | 4/1996 | |
| JP | 08296444 A | * | 11/1996 | |
| JP | 09105331 A | * | 4/1997 | |
| JP | 10061444 A | * | 3/1998 | |

(Continued)

*Primary Examiner* — Mahmoud Gimie
*Assistant Examiner* — John Zaleskas
(74) *Attorney, Agent, or Firm* — Harris Beach PLLC

(57) ABSTRACT

A closing fork and open spring bias of a center power valve for a hitless control of an adjustable exhaust port 2-stroke motorcycle engine includes a closing fork which includes a flat plate that extends into two substantially parallel flat closing fork arms. An internal closing fork base section cylindrical wall accepts a shaft inserted there through. Each torsion spring of two torsion springs has a first extended leg including an approximately 90-degree bend about where the first extended leg extends out from a spring body of each torsion spring and a second leg extending straight out of a body of each torsion spring. Each of the torsion springs is a mirror of each other where the first extended leg extends from a different side. An upgrade kit and a method to convert a power valve system 2-stroke motorcycle engine to a hitless operation are also described.

7 Claims, 23 Drawing Sheets

NEW DEFAULT POSITION OPEN

(56) References Cited

FOREIGN PATENT DOCUMENTS

| | | | | |
|---|---|---|---|---|
| JP | 2000034929 | A | * | 2/2000 |
| JP | 2001012248 | A | * | 1/2001 |
| JP | 2001027136 | A | * | 1/2001 |
| JP | 2005023832 | A | * | 1/2005 |
| JP | 2005315143 | A | * | 11/2005 |

* cited by examiner

1999 YZ250

1999 YZ250

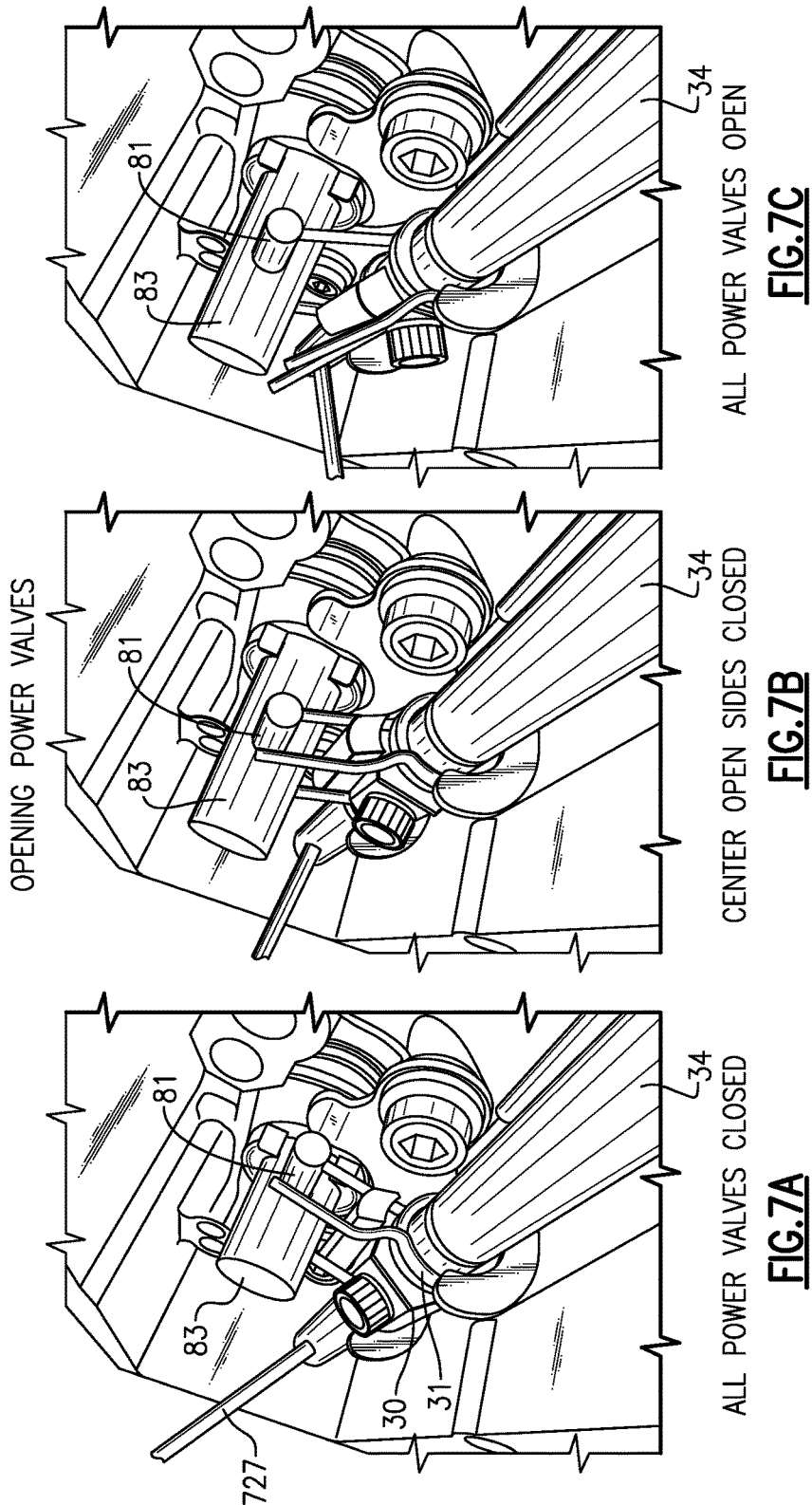

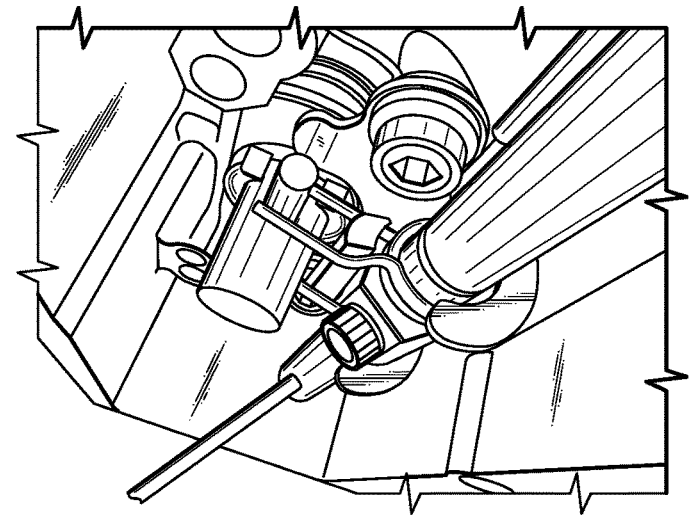
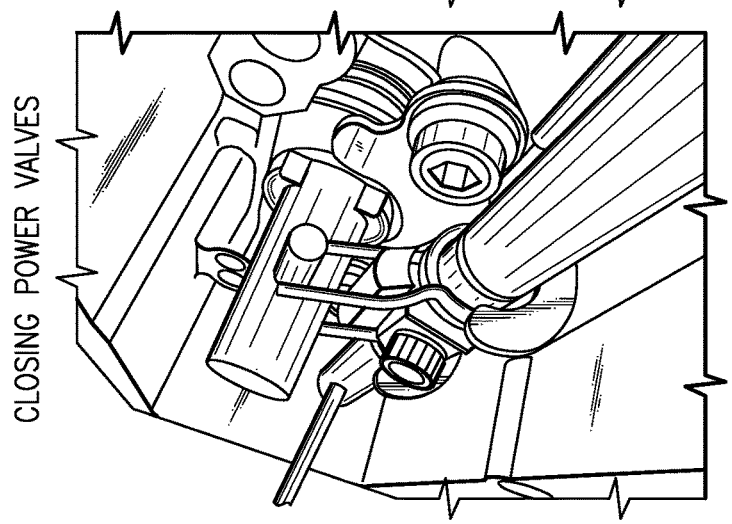
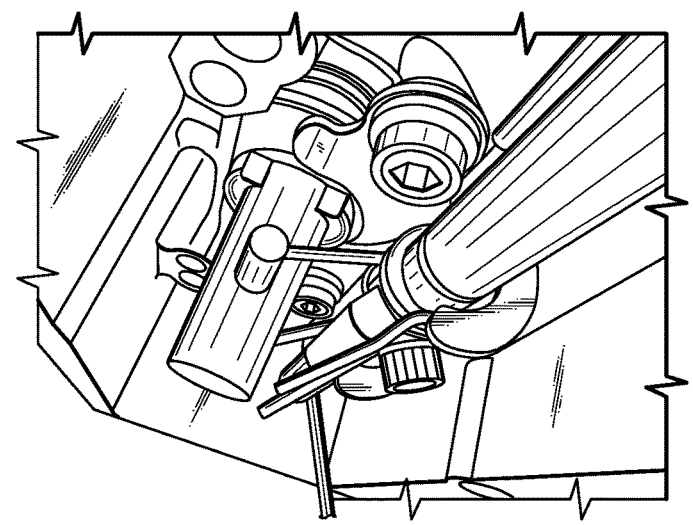

ORIGINAL DEFAULT POSITION CLOSED

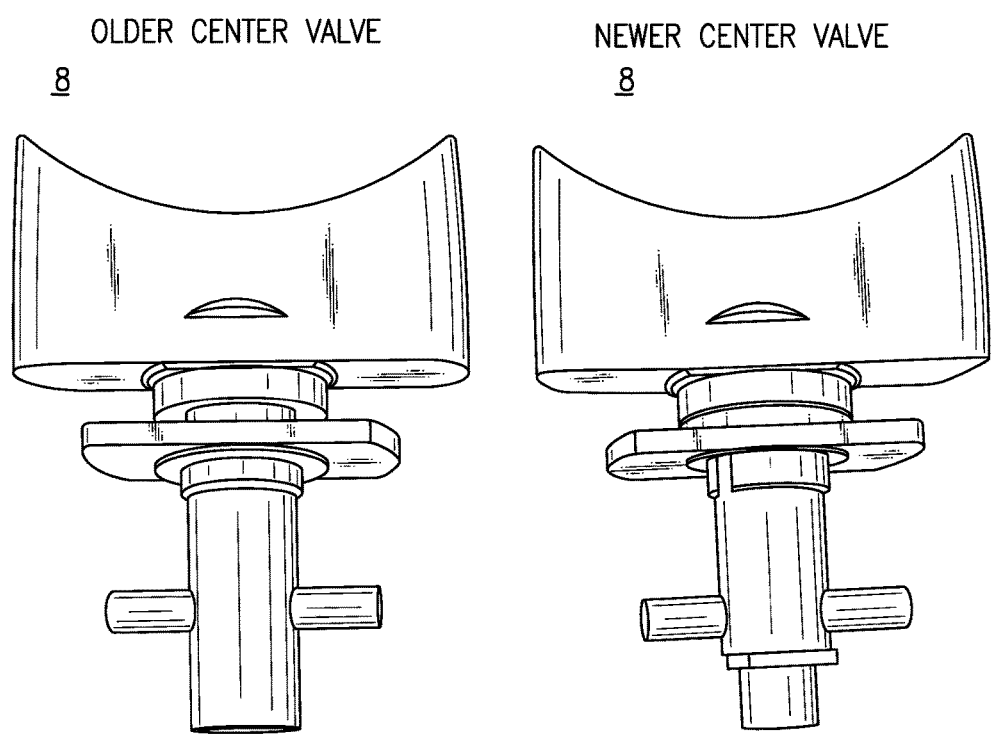
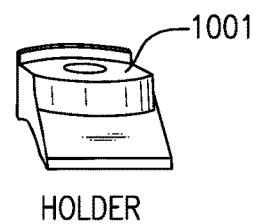
FIG.10

VALVES CLOSED NO CONTACT WITH HOLDER

SPRING TENSION/RESISTANCE ON GOVERNOR

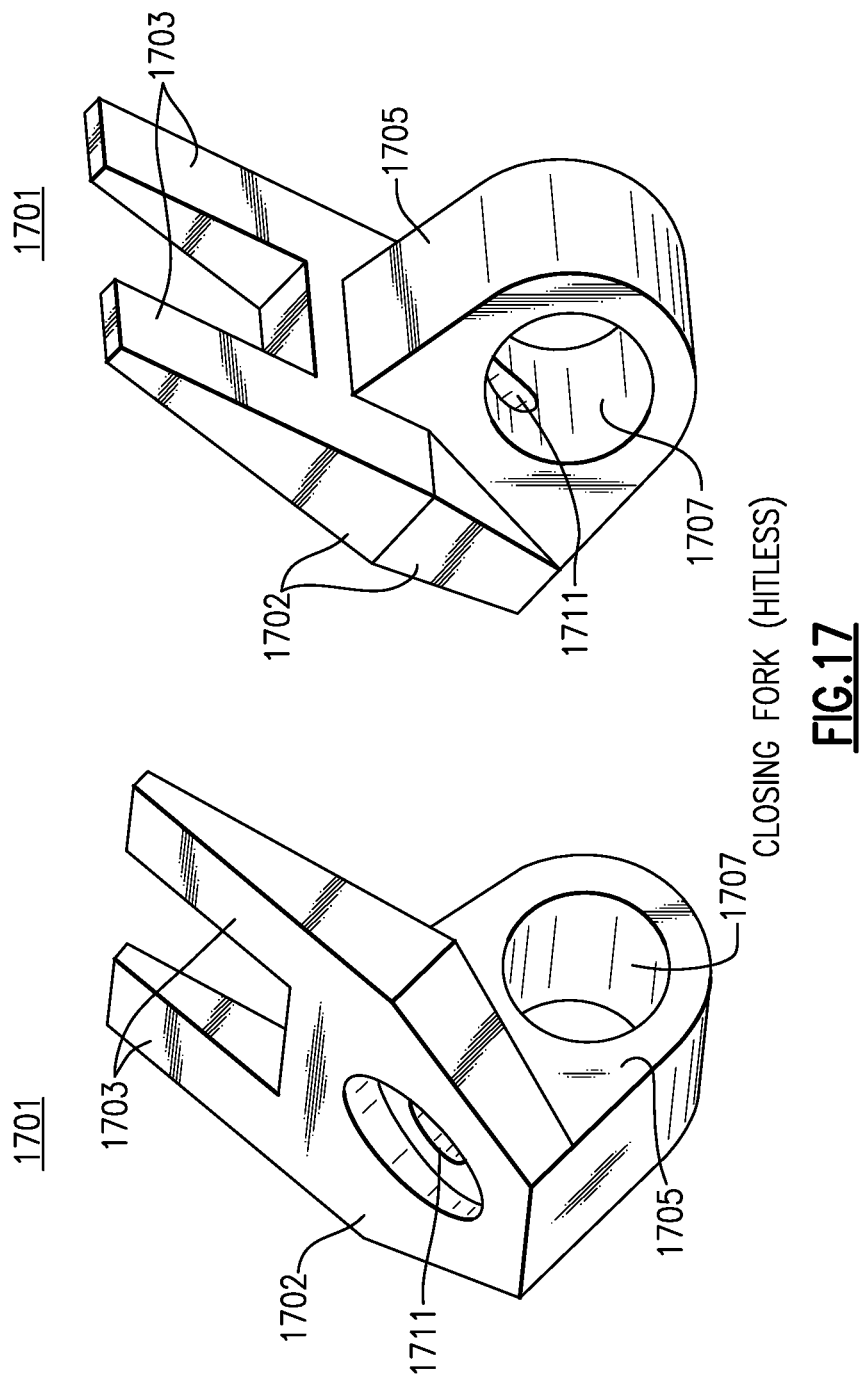
FIG.17 CLOSING FORK (HITLESS)

CLOSING FORK (HITLESS)

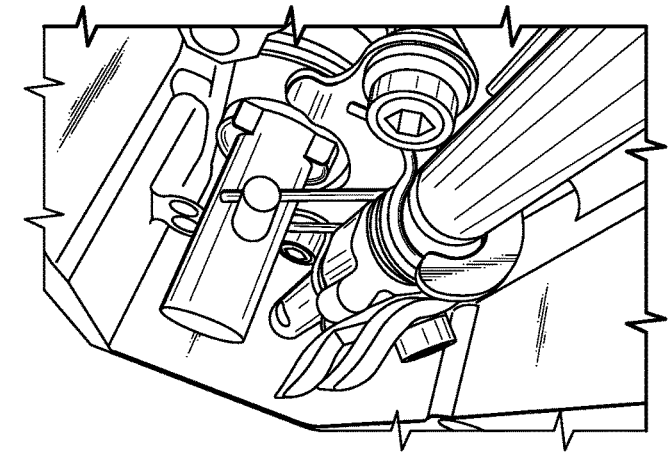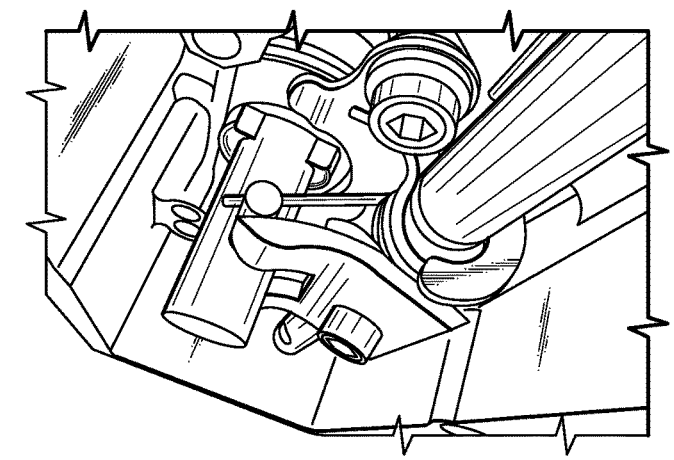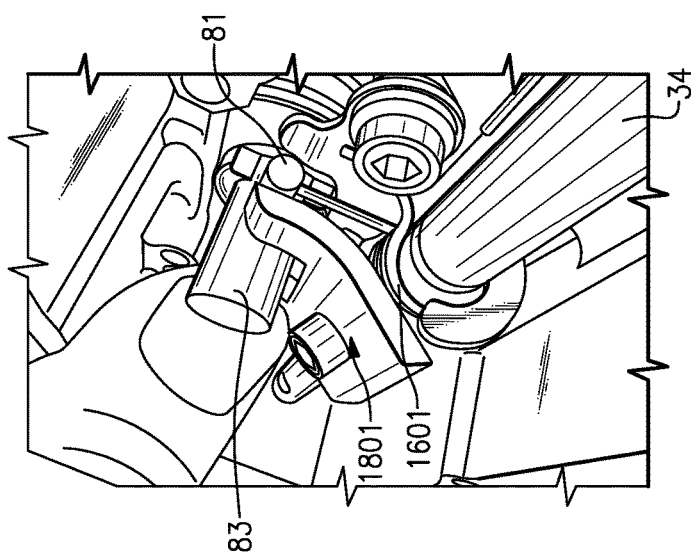

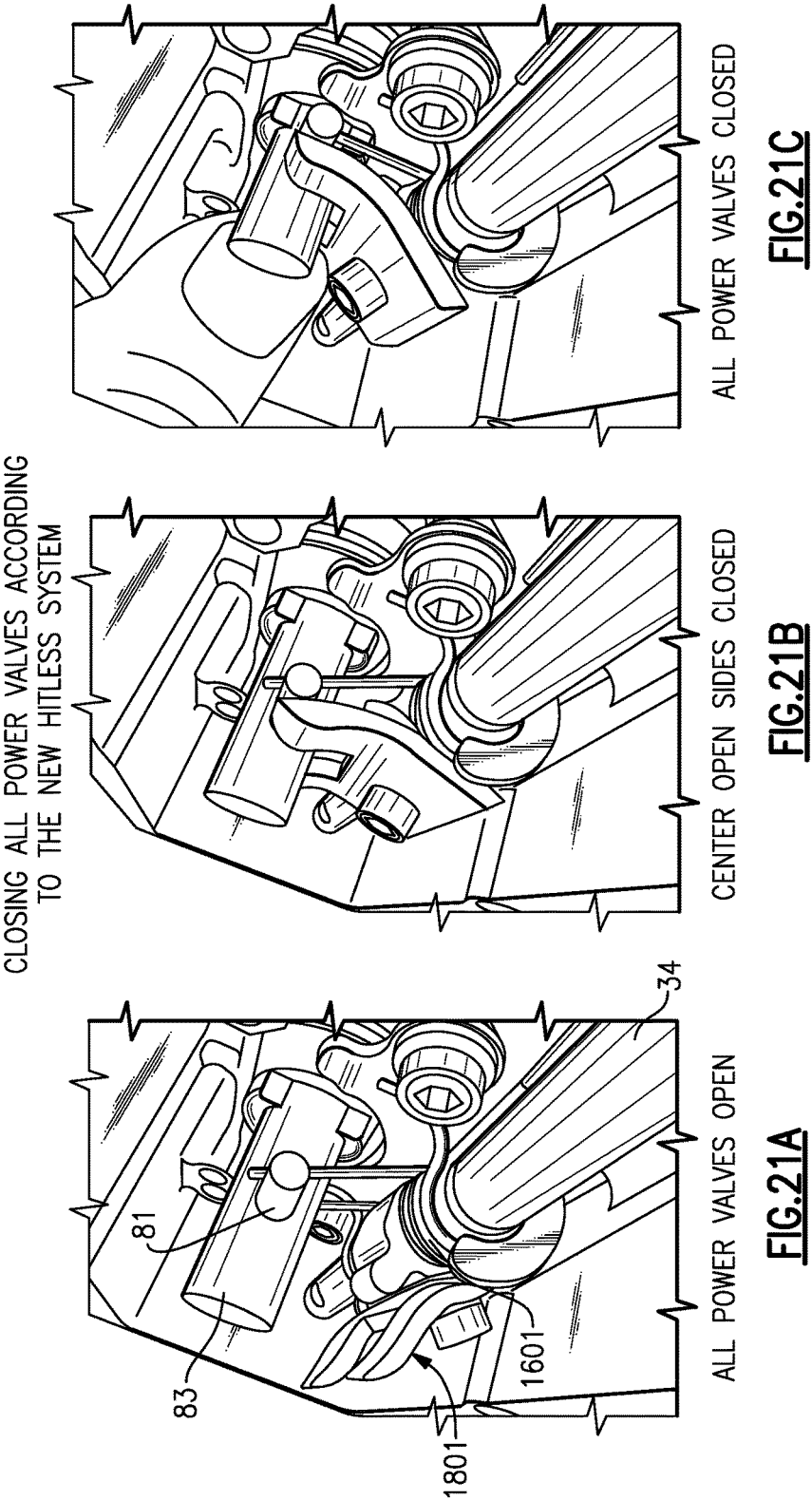

MOTORCYCLE ENGINE POWER VALVE CONTROL UPGRADE KIT

FIELD OF THE APPLICATION

The application relates to motorcycle power valves and particularly to control of power valve position.

BACKGROUND

Off-road motorcycling has become a popular sport enjoyed by racers and riders worldwide. The most popular dirt bikes are relatively light weight motorcycles powered by a high performance 2-stroke engine. Many of the most popular models are manufactured by the Yamaha Motor Corporation of Japan (U.S. Corp. office in Cypress, Calif.).

Most notable among the Yamaha off-road models is the model YZ250, which is the bike of choice for at least sixteen different motorcycle, off-road bike, and dirt bike competitions worldwide. The YZ250 motorcycle is powered by a 249 cc liquid-cooled 2-stroke engine. The YZ250 engine has an adjustable exhaust port known as YPVS™ (Yamaha Power Valve System). At low RPM the valves are closed allowing more compression and port timing producing more torque. As RPM's increase the valves are opened allowing less compression and port timing producing high RPM horsepower.

SUMMARY

According to one aspect, a closing fork and open spring biased center power valve for a hitless control of an adjustable exhaust port 2-stroke motorcycle engine includes a hitless control adjustable exhaust port 2-stroke motorcycle engine closing fork. The closing fork includes a flat plate which extends in a same direction into two substantially parallel flat closing fork arms. The flat plate includes a flat plate interior cylindrical wall which extends perpendicular from a first flat plate surface to a second flat plate surface to define a mounting hole which accepts a mounting bolt. A closing fork base section has a mounting internal cylindrical wall in alignment with and to extend the interior flat plate cylindrical wall to allow the mounting bolt to extend through the closing fork base section to bolt the hitless control adjustable exhaust port 2-stroke motorcycle engine closing fork to a shaft, and an internal closing fork base section cylindrical wall perpendicular to both the interior cylindrical wall and a direction of the substantially parallel flat closing fork arms to accept the shaft inserted there through. Two torsion springs each torsion spring of the two torsion springs have a first extended leg including an approximately 90-degree bend about where the first extended leg extends out from a spring body of each torsion spring and a second leg extending straight out of a body of each torsion spring. Each of the torsion springs is a mirror of each other where the first extended leg extends from a different side, the two torsion springs defining a cylindrical opening which mounts freely and rotatingly over a shaft on either side of the closing fork base section.

In one embodiment, the substantially parallel flat closing fork arms engage two corresponding posts of a center valve of the hitless adjustable exhaust port 2-stroke motorcycle engine to close the center valve by overcoming an open spring bias provided by the two torsion springs.

In another embodiment, the flat plate which extends in a same direction into two substantially parallel flat closing fork arms and the closing fork base section are formed as one integral part.

According to another aspect, an upgrade kit to convert an adjustable exhaust port 2-stroke motorcycle engine to a hitless operation includes a closing fork having forked arms extending from a base portion of the closing fork. The base portion is mountable to an adjustable exhaust port control rod about adjacent to a center adjustable exhaust valve having a pair of transverse posts. The closing fork controls a position of a center adjustable exhaust valve by forked arms which act against the pair of transverse posts as the adjustable exhaust port control rod is rotated from a valve open rotational position to a valve closed rotational position. Two torsion springs mountable by sliding over the adjustable exhaust port control rod on either side of a closing fork mounting bolt secures the closing fork to the adjustable exhaust port control rod. Each torsion spring has a first extended leg stoppable by a surface of an engine and a second leg stoppable by a transverse post of the center adjustable exhaust valve. Both of the two torsion springs cause a spring bias of the center adjustable exhaust valve to a center valve open position. The spring bias to the center valve open position is opposite a spring bias to a valve closed position of an unmodified adjustable exhaust port 2-stroke motorcycle engine. In an all valve open rotational position of the adjustable exhaust port control rod the center adjustable exhaust valve is spring biased open by the two torsion springs, and in an intermediate rotational position of the adjustable exhaust port control rod. The forked arms of the closing fork come into contact with the pair of transverse posts while the center adjustable exhaust valve remains spring biased open, an on further rotation of the adjustable exhaust port control rod towards a valve closed position. The forked arms of the closing fork overcome the open spring bias closing the center adjustable exhaust valve and in a closed valve position, the forked arms of the closing fork pushes the center adjustable exhaust valve to a closed position.

In one embodiment, each of the torsion springs has a first extended leg including an approximately 90-degree bend about where the first extended leg extends out from a spring body of each torsion spring and a second leg extending straight out of a body of each torsion spring, the second leg stoppable by a transverse post of the center adjustable exhaust valve.

In another embodiment, the closing fork having forked arms includes an integral closing fork base portion which includes a cylindrical inner wall that slides over the adjustable exhaust port control rod.

In yet another embodiment, the closing fork having forked arms includes a separate closing fork base portion which includes a cylindrical inner wall that slides over the adjustable exhaust port control rod and a bolt to mechanically affix the closing fork having forked arms to the separate closing fork base portion and to a threaded opening of the adjustable exhaust port control rod.

In yet another embodiment, an original adjustable exhaust port 2-stroke engine before modification exhibits a hesitation followed by a surge of power as the adjustable exhaust port control rod is rotated from a valve closed position to a valve open position and following an upgrade installation of the upgrade kit, a so modified adjustable exhaust port 2-stroke engine exhibits a substantially hesitation free operation without surging as the adjustable exhaust port control rod is rotated from a valve closed position to a valve open position.

In yet another embodiment, the upgrade kit is for a modification of a 2-stroke motorcycle engine wherein the center adjustable exhaust valve includes a power valve.

In yet another embodiment, the upgrade kit is to modify of a 2-stroke motorcycle engine of a YZ250 series motorcycle for a hitless operation of the 2-stroke motorcycle engine.

In yet another embodiment, the upgrade kit is for a modification of a 2-stroke motorcycle engine further including two additional side valves operated by the adjustable exhaust port control rod, wherein an operation of the two additional side valves remains unchanged by an installation of the upgrade kit including the closing fork and the two torsion springs.

According to yet another aspect, a method to convert a power valve system 2-stroke motorcycle engine to hitless operation includes: providing an adjustable exhaust port 2-stroke motorcycle engine; providing an upgrade kit including a closing fork having forked arms, and two torsion springs to spring bias a center adjustable exhaust valve to an open position; removing parts of an unmodified power valve shaft which control the operation of a center valve from a shaft including a link lever and two torsion springs; installing the closing fork and the two torsion springs to over the shaft and securing the closing fork to the shaft by inserting a bolt through the closing fork and threading the bolt into an original threaded hole of the shaft about adjacent to a center exhaust valve; and wherein the installed closing fork and two torsion springs spring bias a center adjustable exhaust valve to an open position for a hitless operation of the power valve system 2-stroke motorcycle engine.

In one embodiment, the step of removing parts of an unmodified power valve shaft further includes removing a holder.

According to yet another aspect, a closing fork and open spring bias of a center power valve for a hitless control of an adjustable exhaust port 2-stroke motorcycle engine includes a hitless control adjustable exhaust port 2-stroke motorcycle engine closing fork comprising at least one closing fork arm. A closing fork arm base slidingly engages a power valve control shaft. At least one spring engages a power valve/ adjustable exhaust valve to cause a valve open bias.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 7A is a drawing showing the opening sequence of the power valves from all power valves closed;

FIG. 7B is a drawing showing the center power valve open and the side power valves closed;

FIG. 7C is a drawing showing all power valves open;

FIG. 8A is a drawing showing the closing sequence of the power valves from all power valves open;

FIG. 8B is a drawing showing the center power valve open and the side power valves closed;

FIG. 8C is a drawing showing all power valves closed;

FIG. 10 shows a drawing of the earlier valve assembly, and the later version with holder;

FIG. 17 shows two different views of one exemplary embodiment of a new hitless closing fork;

FIG. 20A is a drawing showing the opening sequence of the power valves from all power valves closed according to the new hitless system;

FIG. 20B is a drawing showing the center power valve open and the side power valves closed;

FIG. 20C is a drawing showing all power valves open;

FIG. 21A is a drawing showing the closing sequence of the power valves from all power valves open according to the new hitless system;

FIG. 21B is a drawing showing the center power valve open and the side power valves closed;

FIG. 21C is a drawing showing all power valves closed;

DETAILED DESCRIPTION

Figure 1:
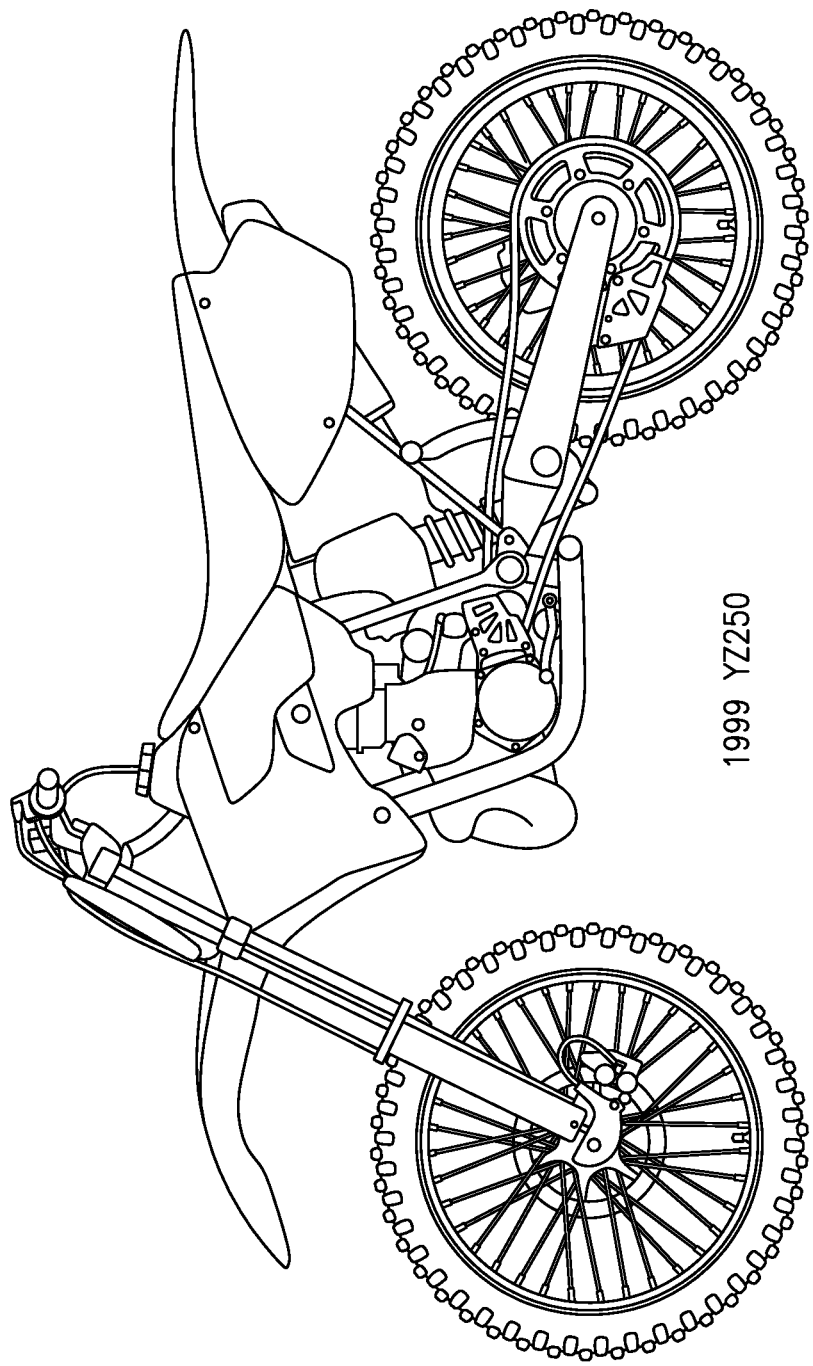
FIG. 1 shows an illustration of the left side of a Yamaha Motor Corp. 1999 YZ250 motorcycle.
Figure 2:
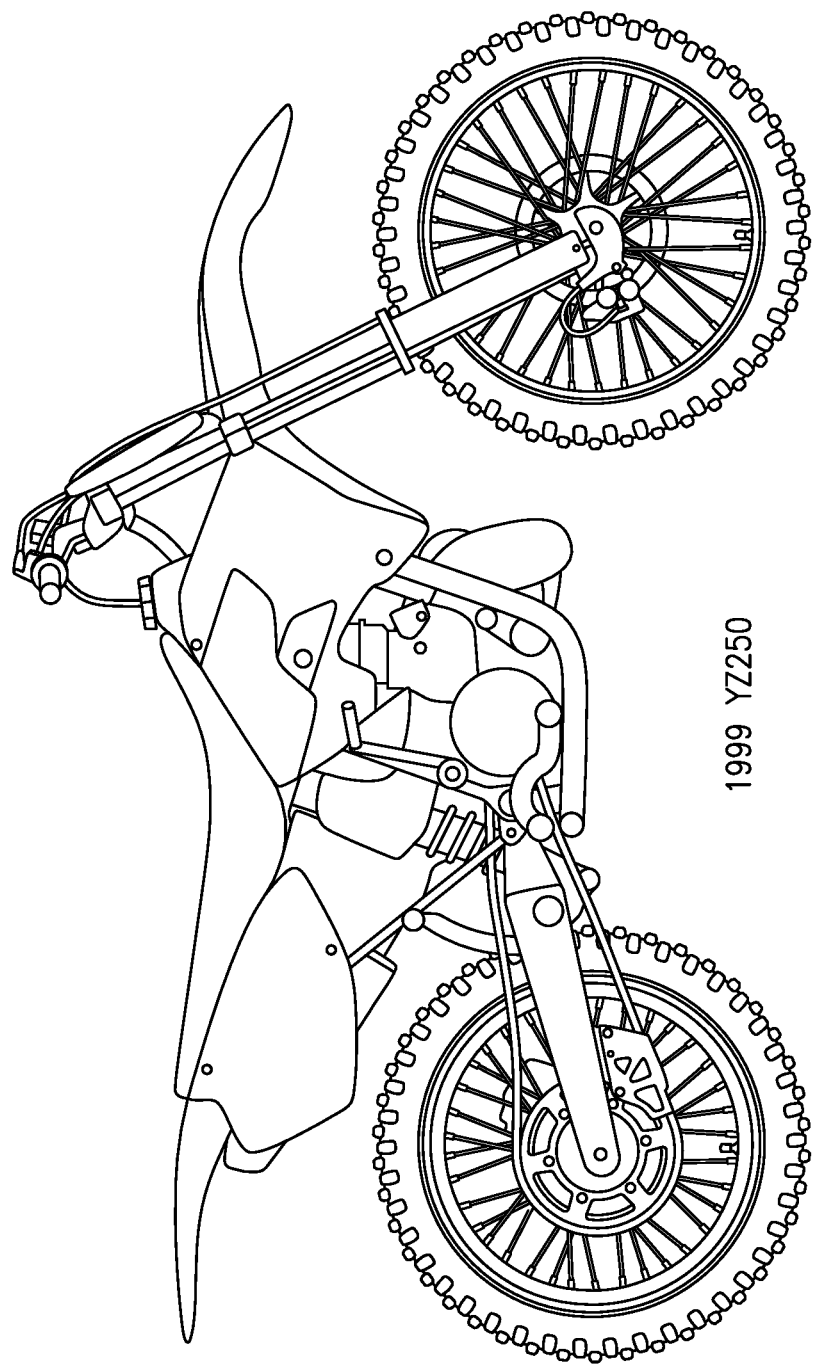
FIG. 2 shows an illustration of the right side of the motorcycle of FIG. 1.

FIG. 1 shows an illustration of the left side of a Yamaha Motor Corp. 1999 YZ250 motorcycle. FIG. 2 shows an illustration of the right side of the motorcycle of FIG. 1. As described hereinabove, the current generation YZ250 engine has an adjustable exhaust port power valve system (PVS) commonly referred to as the YPVS™ (Yamaha Power Valve System).

Figure 3:
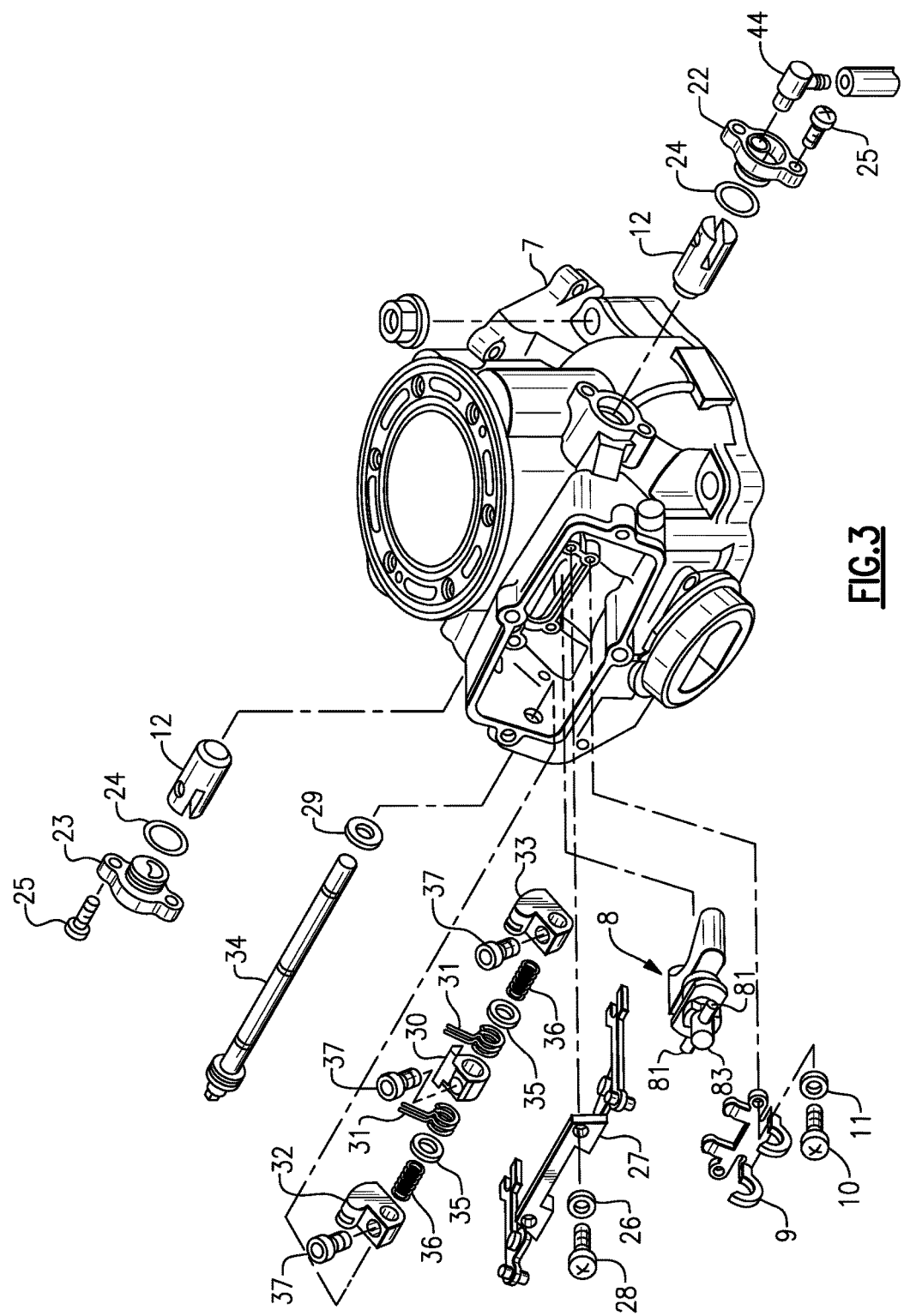
FIG. 3 shows an exploded diagram of an exemplary YZ250 motorcycle engine.

FIG. 3 shows an exploded diagram of an exemplary YZ250 motorcycle engine. The YPVS™ parts fit into the valve housing of cylinder 7. The YPVS™ parts operate valves 12 and valve assembly 8, a center adjustable exhaust valve, which controls the opening of the exhaust path. Valve assembly 8 includes transverse posts 81 which extend outward from a center valve stem 83. The posts 81 are typically provided by a common rod which extends through a transverse cylindrical opening in center valve stem 83. Shaft 34 supports from left to right, pulley 32, compression spring 36, plate washer 35, torsion spring 31, link lever 30, torsion spring 31, plate washer 35, compression spring 36, and pulley 33. Other related parts include holder 9 and link assembly 27. The pair of torsion springs 31 spring bias side valves 12 to a valve closed position. At low RPM the three power valves (valve assembly 8, and the two side valves 12) are closed allowing more compression and a port timing which produces more torque. As RPM's increase, the valves are opened allowing less compression and port timing producing higher RPM horsepower.

The YPVS™ is controlled by a governor that is gear driven directly off the crankshaft. Centrifugal weights in the governor overcome spring pressure and move a linkage.

Figure 4:
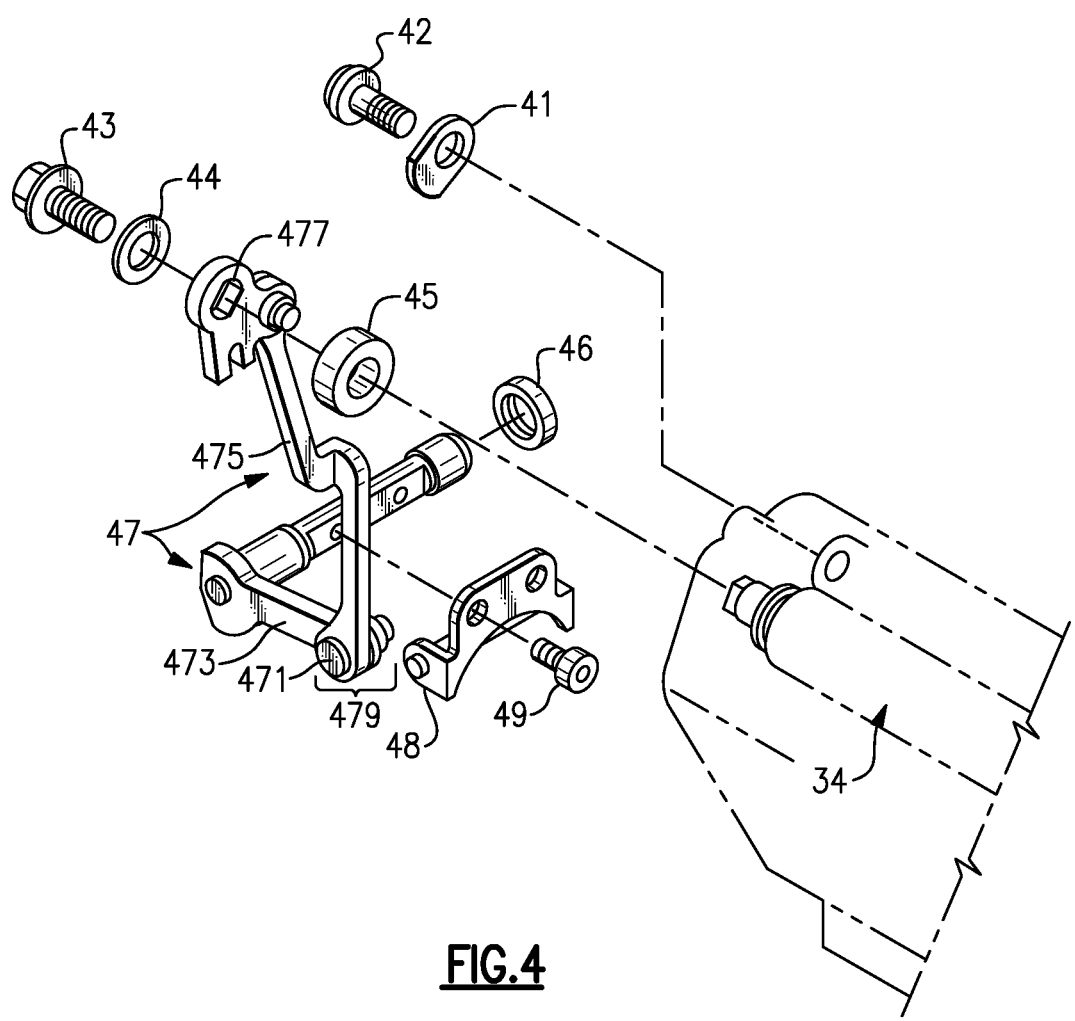
FIG. 4 shows an exploded diagram illustrating the linkage push rod assembly.

FIG. 4 shows an exploded diagram illustrating the linkage push rod assembly 47. The push rod assembly 47 couples to shaft 34 (FIG. 3) via oil seal 45, a keyed opening 477 in the top linkage arm 475 of the linkage push rod assembly 47, and is affixed to shaft 34 by flange bolt 43 and plate washer 44. The push rod assembly 47 lower linkage arm 473 is linked to the top linkage arm 475 via a pinned pivot point 479. Lower linkage arm 473 couples to the governor (not shown in FIG. 4) via governor fork 48 and rotates about oil seal 46.

Figure 5:
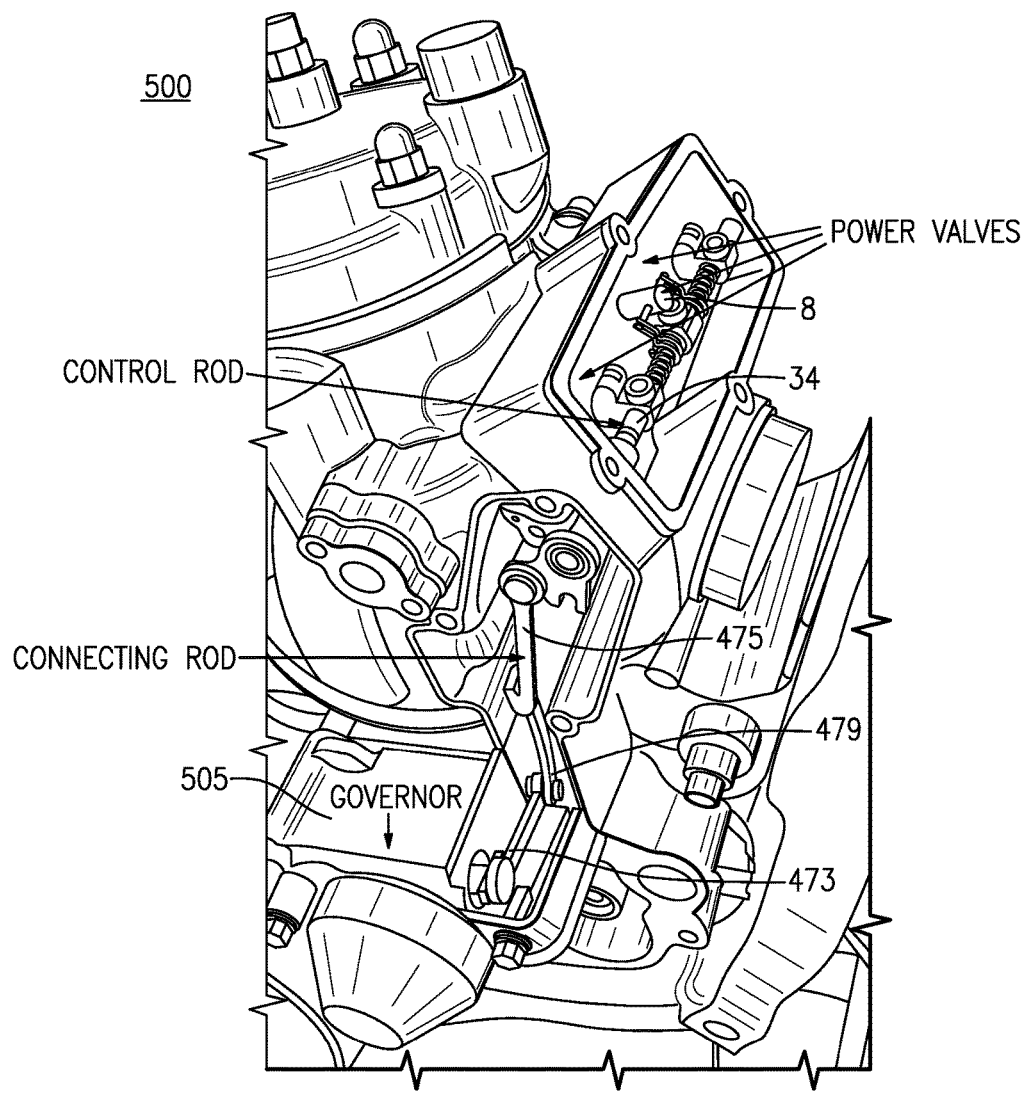
FIG. 5 is a drawing which illustrates an exemplary YZ250 engine.

FIG. 5 is a drawing which illustrates an exemplary YZ250 engine 500. The control rod shaft 34 controls the positions of power valves 12, and valve assembly 8. The push rod assembly 47 can be seen linking the governor 505 to shaft 34 as described hereinabove. The linkage moves through many points and pivots from the governor about pinned pivot point 479 up the right side of the engine to the power valve control rod. When the linkage moves, it rotates the control rod (shaft 34) that operates a two-stage power valve system which includes valve assembly 8, and the two side valves 12.

The first stage of the YPVS™ includes a main center valve (valve assembly 8) that operates in the first half of the linkage travel/control rod rotation. The second stage consists of two side valves (power valves 12, one on each side) that are controlled together as a pair in the second half of the control rod (shaft 34) rotation in response to the linkage travel. Because there are two stages to the YPVS™, each stage operating in a different half of the control rod rotation, Yamaha had to make a flexible connection for the main center valve. This was done by sandwiching the main center valve between the legs of a very stiff tension spring. There is one spring (torsional spring 31) on each side of the main center valve assembly 8. These torsion springs 31 are fixed to the control rod (shaft 34) by means of the link lever 30.

Figure 6:
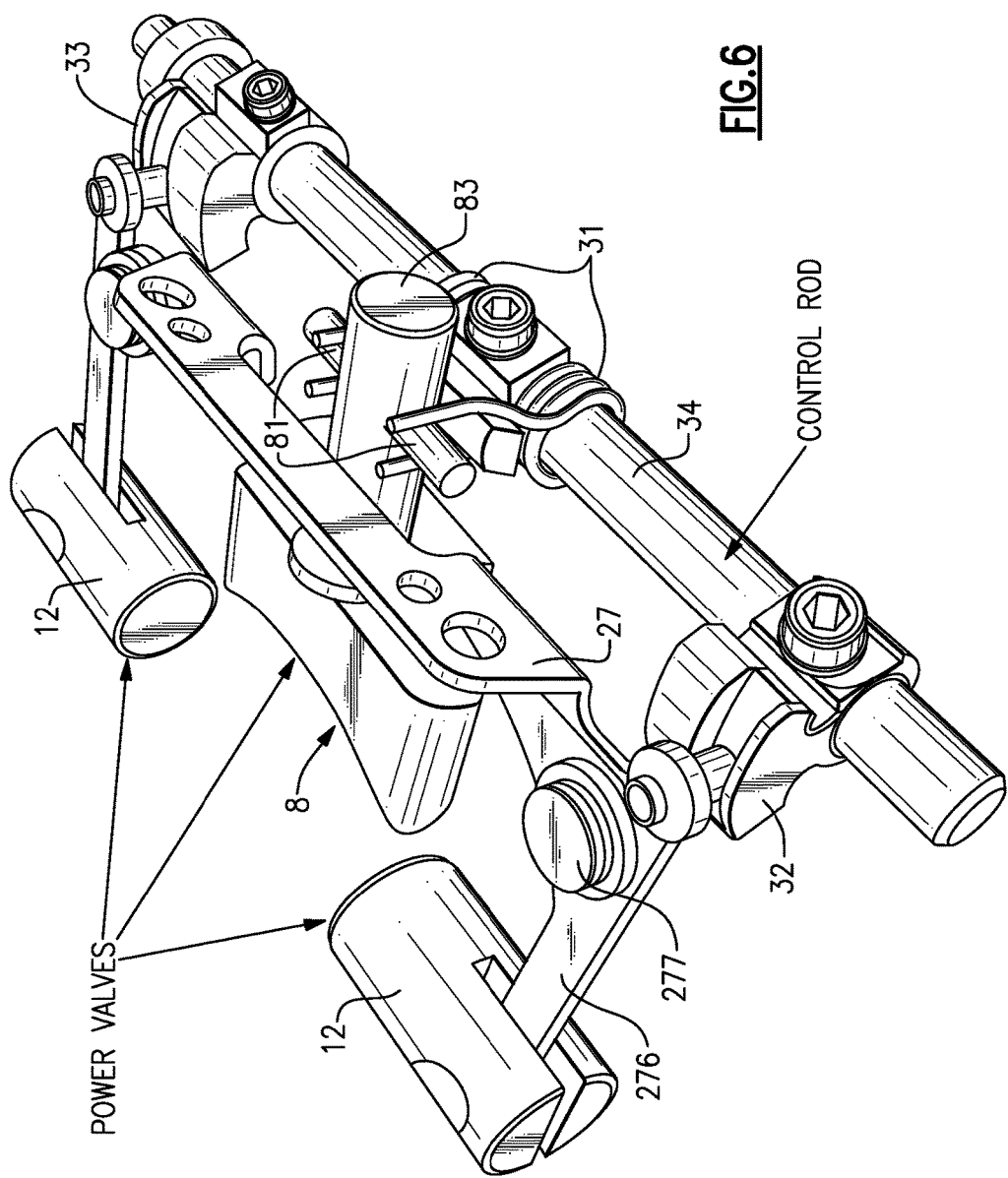
FIG. 6 is a drawing showing the center power valve and the side power valves coupled to the control rod.

FIG. 6 is a drawing showing the center power valve and the side power valves coupled to the control rod with reference designators labeled according to FIG. 3. Pulley 32 (left side) and pulley 33 (right side) can be seen to operate power side valves 12 on each side via the arms 276 and pivot points 277 of linkage 27 (FIG. 6).

Opening the valves: FIG. 7A, FIG. 7B, and FIG. 7C show shaft 34 rotating from all valves closed to all valves open. An Allen key 727, not part of the YPVS™, was inserted into a hole in shaft 34 to rotate the shaft through the three positions of FIG. 7A, FIG. 7B, and FIG. 7C. FIG. 7A shows all valves closed. In FIG. 7B, one leg of the stiff torsion springs (torsion springs 31) pulls the main center valve open by acting against transverse post 81 until valve assembly 8 hits its stop (halfway through the control rod rotation). Transverse posts 81 are typically present as a single rod which extends through valve stem 83 and extend outwards from center valve stem 83. As can be seen in FIG. 7C, after the main center valve (valve assembly 8) hits its stop (outward most travel), the stiff torsion springs (torsion springs 31) open up to allow the control rod to continue rotating operating the second stage (side valves 12) in the second half of control rod rotation (shaft 34).

Closing the valves: FIG. 8A, FIG. 8B, and FIG. 8C show shaft 34 rotating from all valves open to all valves closed. FIG. 8A shows all valves opened. In FIG. 8B, the stiff torsion springs (torsion springs 31) are relieved as the governor pulls the second stage (side valves 12) closed (at half rotation of shaft 34). As can be seen in FIG. 8C, then the other legs of the stiff torsion springs (torsion springs 31) push the main center valve assembly 8 closed.

Figure 9:
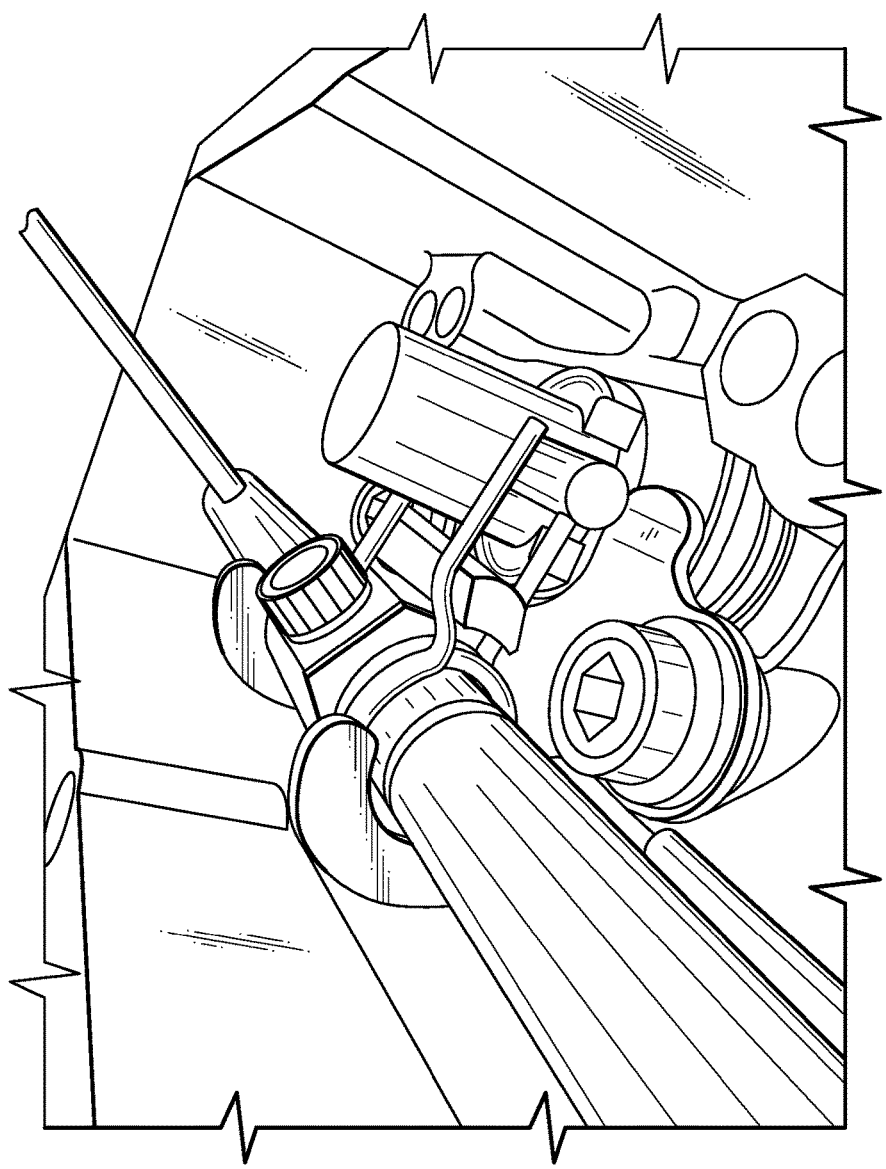
FIG. 9 shows the YPVS™ in its original default closed position.

FIG. 9 shows the YPVS™ in its original default closed position. When the linkage is disconnected from the control rod, the default position is all valves closed.

Yamaha changed the YPVS™ in 2003. Some reports were that when the main center valve was closed, exhaust pressure would push the valve open against the stiff tension springs and cause it to flutter. The flutter was thought to cause a poor low RPM performance, and in some extreme cases caused the main center valve to break.

FIG. 10 shows a drawing of the earlier valve assembly 8, and the later version with holder 1001. Yamaha changed the tip of the main center valve to accommodate a holder 1001 that would engage the top of the valve (valve assembly 8) only after full closed position. This change was to prevent the main center valve from fluttering in the closed position.

Figure 11:
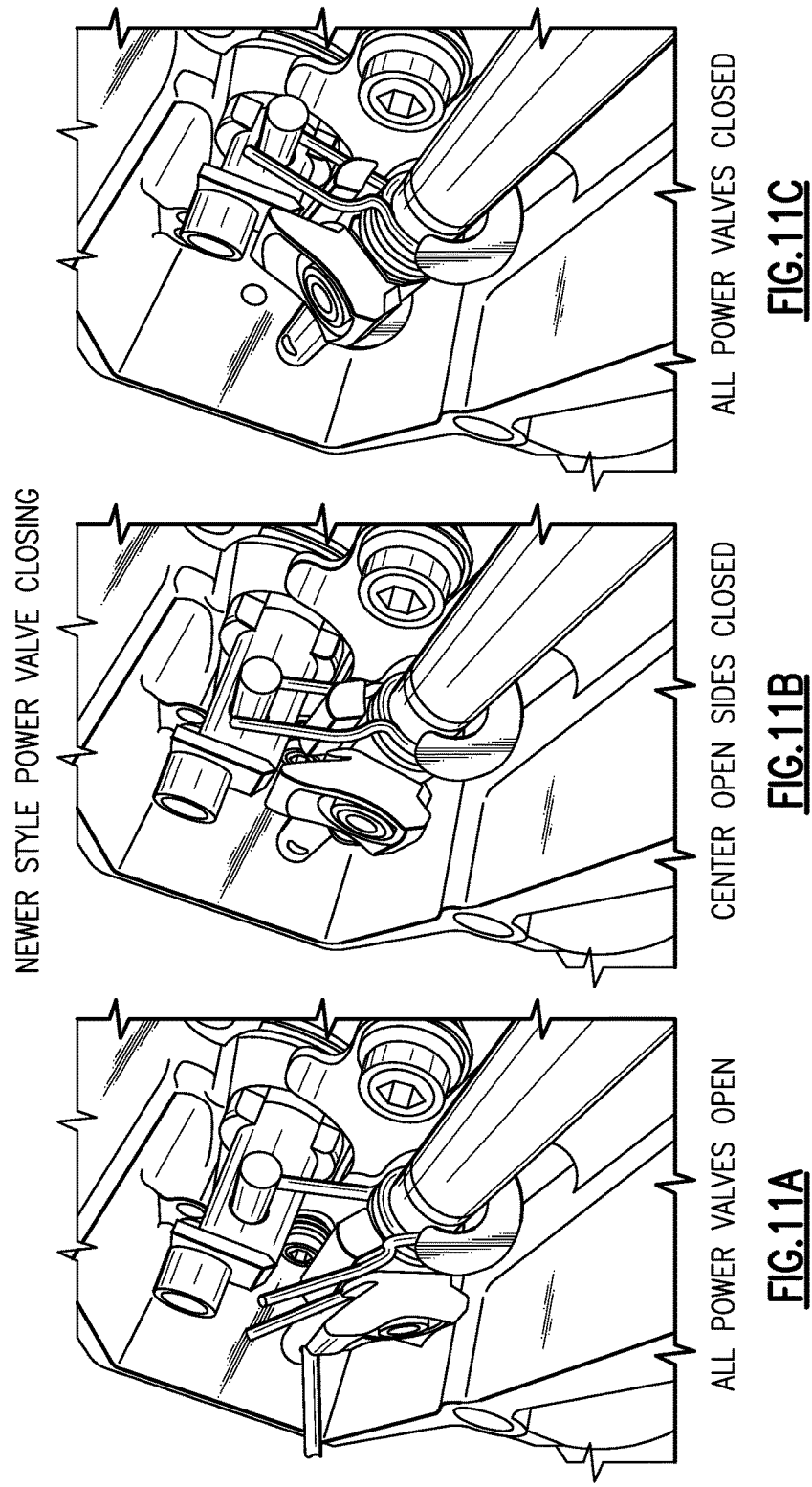
FIG. 11A is a drawing showing the closing sequence of the later style power valves from all power valves open.
FIG. 11B is a drawing showing the center power valve open and the side power valves closed.
FIG. 11C is a drawing showing all power valves closed.

FIG. 11A, FIG. 11B, and FIG. 11C show valve assembly 8 of the later version YPVS™ with holder 1001 rotating from all valves open to all valves closed. FIG. 11A shows all valves open. In FIG. 11B, the stiff torsion springs (torsion springs 31) are relieved as the governor pulls the second stage (side valves 12) closed (at half rotation of shaft 34). As can be seen in FIG. 11C, then the other legs of the stiff torsion springs (torsion springs 31) push the main center valve assembly 8 closed. Holder 1001 can be seen over the top of valve assembly 8 where it prevents valve assembly 8 from opening.

Figure 12:
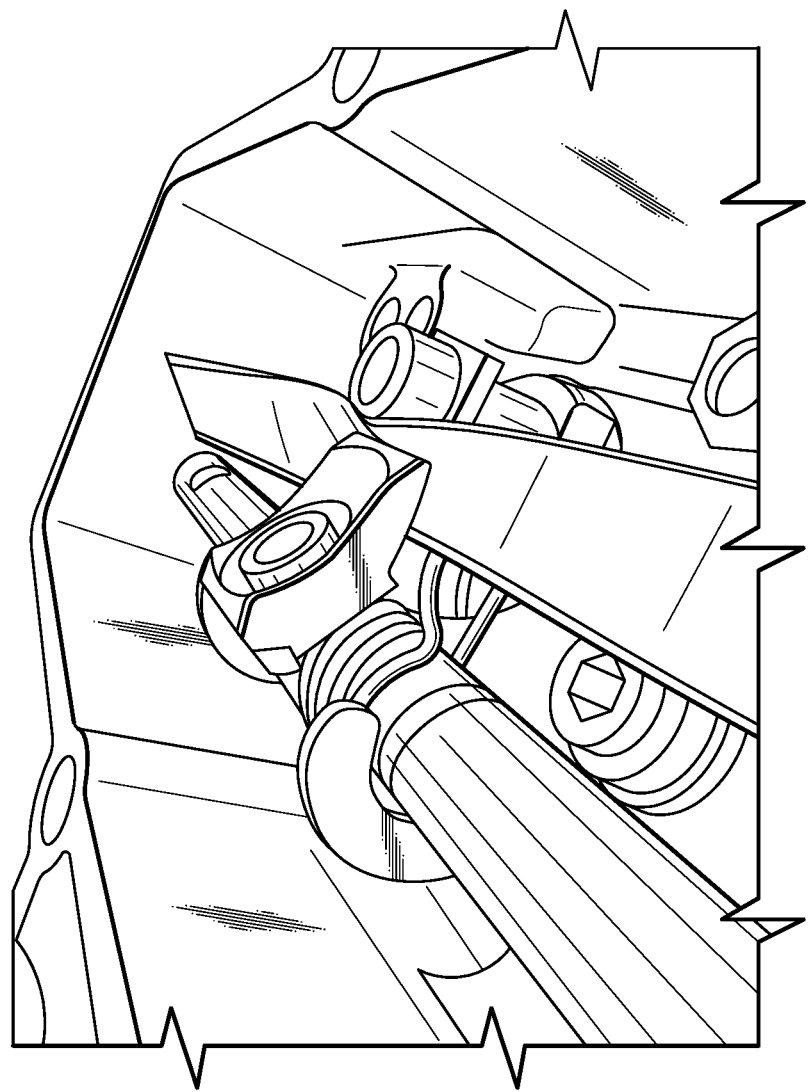
FIG. 12 is a drawing showing the non-contact arrangement of holder over the top of valve assembly.

FIG. 12 shows a non-contact arrangement of holder 1001 over the top of valve assembly 8.

The FIG. 10 solution was also problematic, because if the holder came in contact with the main center valve before full closed position it would break the new tip off from the main center valve.

Figure 13:
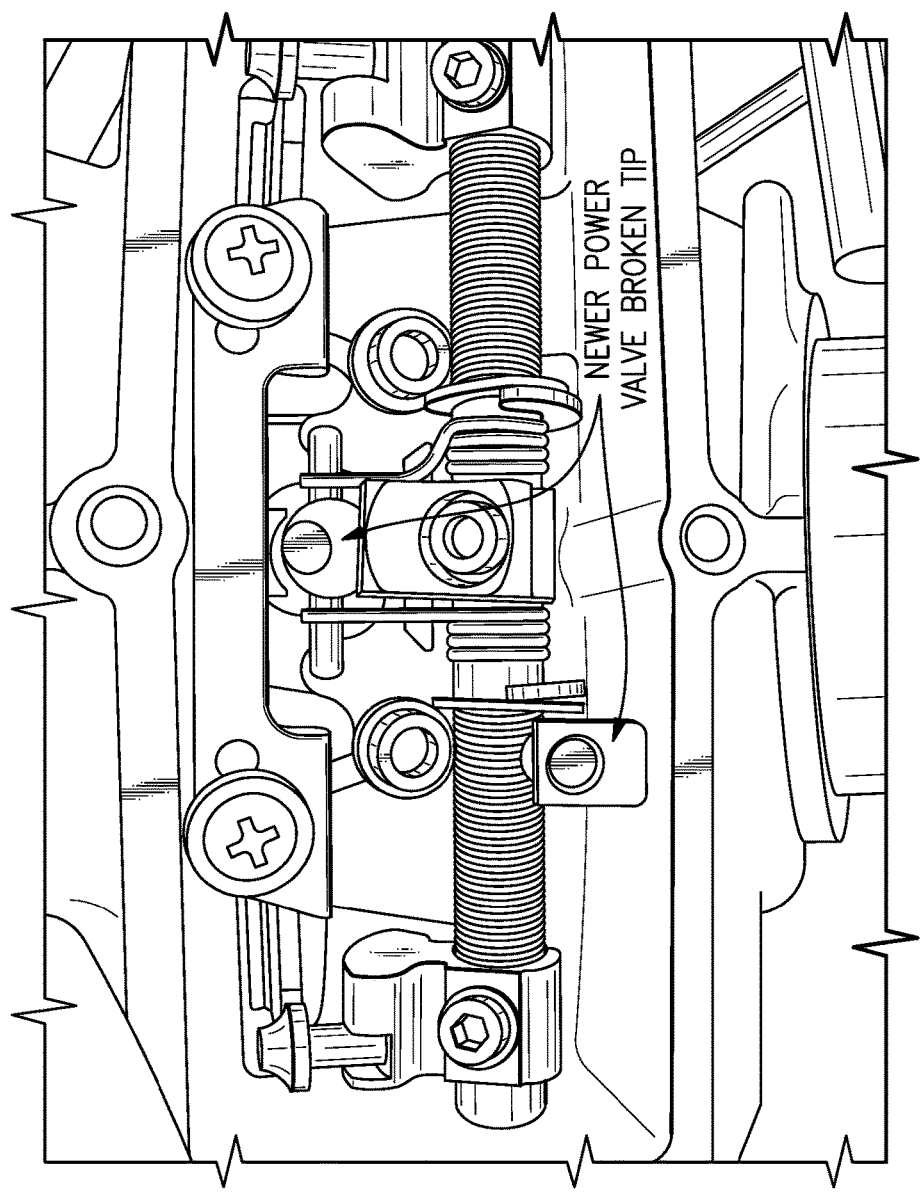
FIG. 13 is a drawing that shows a newer version of the power valve where the tip is broken off.

FIG. 13 shows a drawing illustrating a newer version of the power valve (valve assembly 8) where the tip is broken off. After replacing the valve multiple times most people would leave it broken because it would then operate the same as the prior years and the difference was said to be insignificant for most riders.

The "HIT" problem: A common problem on later model (1999+) motorcycles is that the linear governor of the YPVS™ system works smoothly through the first half of its travel then it suddenly encounters a significant outside force/resistance for the second half of its travel. The motorcycle driver experiences a smooth acceleration for the first half of the RPM range then a noticeable hesitation where a resistance-force is encountered. When that resistance-force is overcome, the second stage of the YPVS™ opens releasing a large surge of power or a "HIT". Thus the motorcycle driver experiences smooth operation—then hesitation—followed by a surge. No amount of tuning, and no presently available products solve the problem. There is need for a solution to the HIT problem.

Identification of the cause of the HIT problem: It was realized that the HIT problem is caused by the operation of the three valves combined with force multiplication by the governor linkage.

Figure 14:
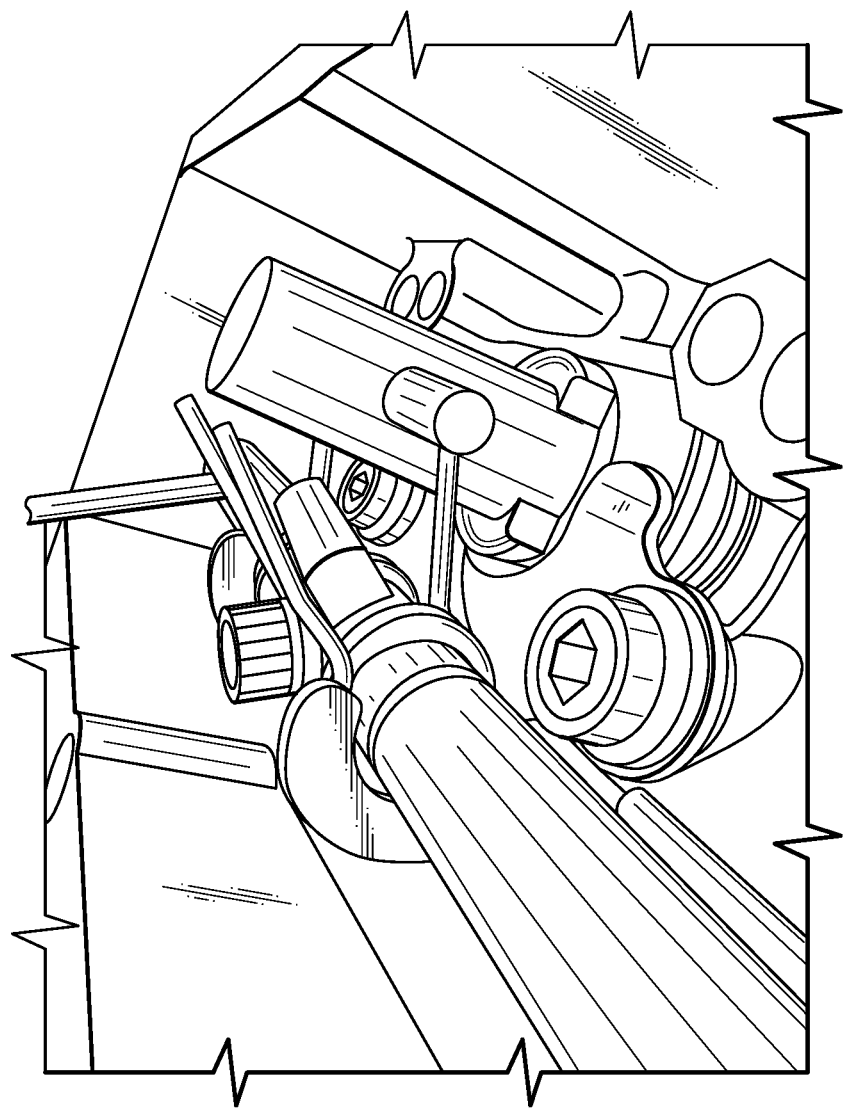
FIG. 14 is a drawing that shows spring/tension resistance on the governor.

FIG. 14 is a drawing that shows spring/tension resistance on the governor 505. When the main center valve assembly 8 is fully open (halfway through control rod (shaft 34) travel) the force of the two stiff torsion spring (torsion springs 31) opening, along with the friction of the second stage side valves opening, all create a resistance/force on the control rod (shaft 34) that suddenly starts halfway through its rotation. This combine force is multiplied through a mechanical advantage/leverage created by the linkage 47 to the governor 505.

Figure 15:
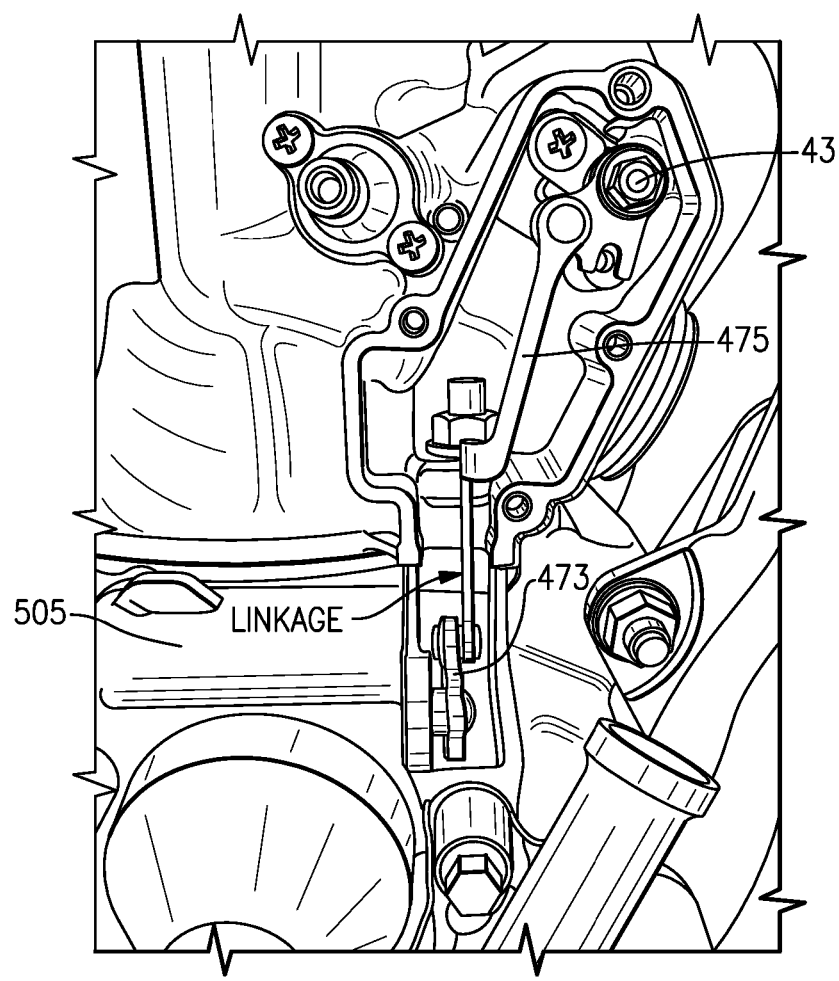
FIG. 15 is a drawing showing another view of the linkage between the governor and the control rod.

FIG. 15 is a drawing showing another view of the linkage 47 between governor 505 and control rod shaft 34 as affixed to the control rod shaft by flange bolt 43.

Solution to the HIT problem: A new "hitless" system as described in more detail hereinbelow substantially eliminates the outside force acting on the governor. The hitless solution creates a new connection between the main center power valve assembly 8 and the control rod (shaft 34) that does not add resistance/force to the governor.

In the description which follows, the complete upgraded power valve system (PVS) as upgraded operates the valve positions between the closed and opened valve positions with respect to shaft 34 as described hereinabove. The upgrade includes replacement of the original torsion springs 31 and installation of a new closing fork part replacing lever link 30.

The original torsion springs 31 (which spring biased side valves 12 closed) are now replaced by different torsion springs. Following the upgrade, new spring bias is opposite, now spring biasing valve assembly 8 open.

Figure 16A:
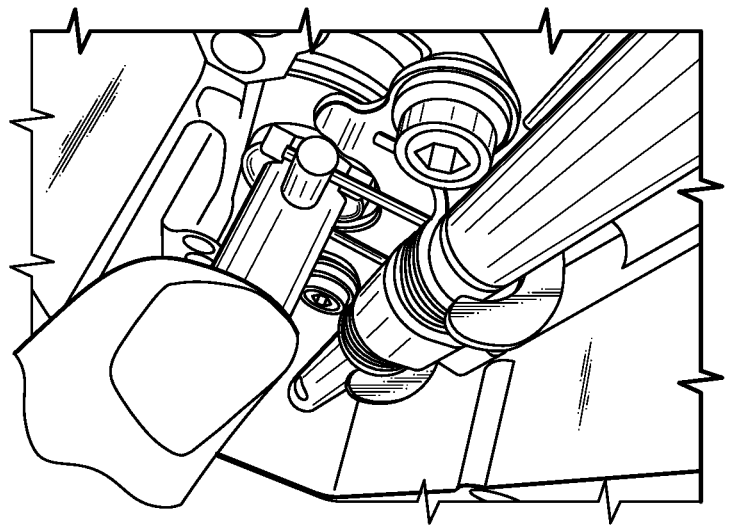
FIG. 16A is a drawing showing how the center valve is spring biased to the open position according to the new hitless system.
Figure 16B:
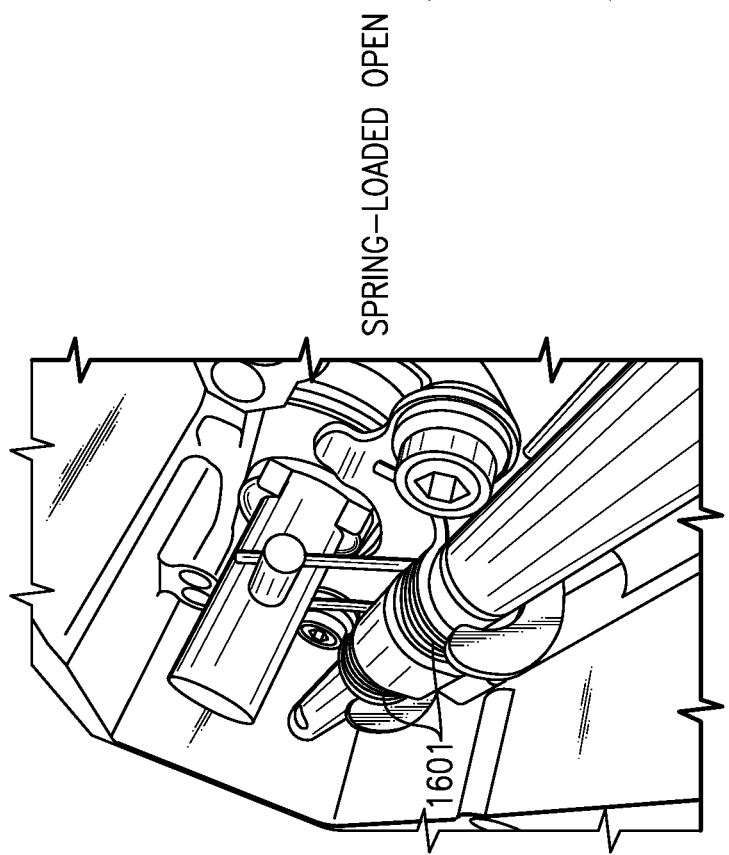
FIG. 16B shows the center valve of FIG. 16A being held closed against the open spring bias.

FIG. 16A and FIG. 16B show a new spring structure (torsion springs 1601) which replaces the original torsion springs 31 (FIG. 3). In the new system, two new light torsion springs are slid over shaft 34. However, torsion springs 1601 are not mounted to, nor controlled by the control rod (shaft 34). One leg of each spring is stopped against the engine cylinder (in some versions, there is a cylinder with a plate attached to the cylinder on which the leg rests, which we define as included in the use of the word "cylinder" herein). The other leg of each spring is stopped by the underside of the main center valve. The main center valve is now spring biased to the full open position. In FIG. 16A, it can be seen that before the new closing fork is installed, valve assembly 8 is held open by the open bias force of spring 1601. Before the new closing fork is installed, valve assembly 8 can be pushed close against the open bias force of spring 1601 by pressing down with a fingertip on the top of valve assembly 8. FIG. 16B shows the center valve of FIG. 16A being held closed against the open spring bias. Thus, when partially assembled, valve assembly 8 moves to an open position by a new open spring bias technique. Yet, when the new system is fully assembled, the opening and closing operation of side valves 12 with respect to the rotational position of shaft 34 remains unchanged.

Closing fork: FIG. 17 shows two different views of one exemplary embodiment of a new hitless closing fork 1701. The structure of closing fork 1701 includes a flat plate 1702 which extends into two forked arms 1703 and a closing fork base portion 1705. A cylindrical through wall 1711 from a top surface to a bottom surface of the base portion 1705 defines a hole through which a bolt is inserted to secure the upgrade kit closing fork 1705 to shaft 34 using an existing threaded hole in shaft 34. The only part of the upgrade kit that is fixed mounted to the control rod is the new closing fork 1701. Closing fork 1701 closes the spring loaded main center valve (spring biased open) from its full open default position.

Figure 18:
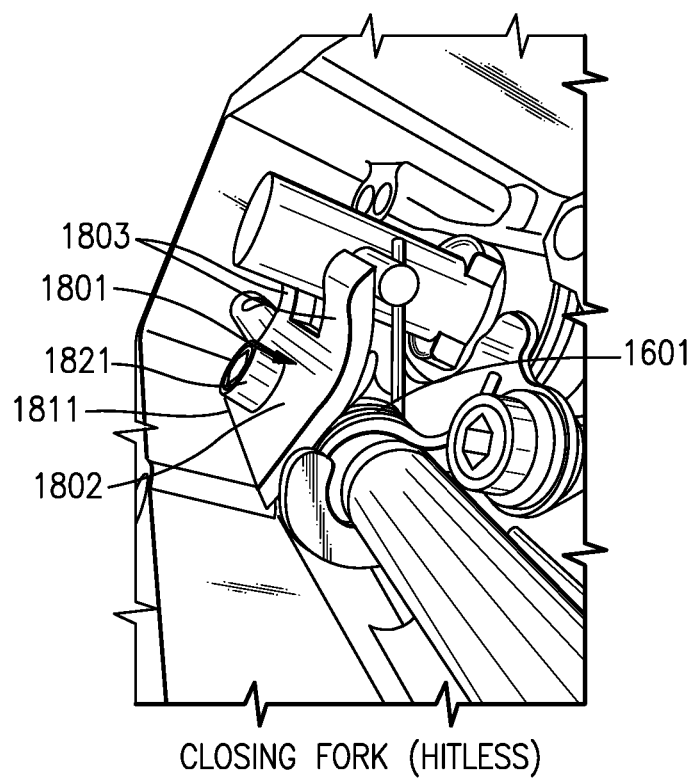
FIG. 18 shows another exemplary embodiment of a closing fork.

FIG. 18 shows another embodiment of closing fork 1801 having closing forked arms 1803 which extend from a flat mounting plate section 1802. In this embodiment, the closing fork is bolt mount to shaft 34 via a separate closing fork base section. Shaft 34 slides through a cylindrical interior wall section which defines an opening through the base section under the flat mounting plate section 1802 which extends into closing fork arms 1803. Both of the closing fork 1801 and flat mounting plate section 1802 are bolted (bolt 1821) to shaft 34 by use of the existing threaded hole in shaft 34. Bolt 1821 extends through a cylindrical wall defining a hole in plate 1802 of closing fork 1801 (hole and cylindrical wall 1811 not visible in FIG. 18).

The shape of closing fork 1801 can vary without changing the new hitless closing fork system and method. For example, during testing, the bevel at the ends of the forked arms was made to avoid making contact with the cover. However, it was found that there was no interference and in most embodiments, it is now believed that the bevel is not needed.

For initial testing and proof of principle, the closing fork of FIG. 18 and the later exemplary valve closing and opening illustrations according the new hitless closing fork system and method were cut and formed from a steel plate stock. The ears were cut off the original link lever 30 and closing fork 1801 was affixed over the modified link lever 30. The forked arms 1803 of closing fork 1801 were curved because the flat spot of the modified link lever 30 was not at the correct angle. It is contemplated that in most embodiments of the forked arms of the closing fork of either the one-piece embodiment of FIG. 17, or the two-piece embodiment of FIG. 18, will be substantially straight as shown in FIG. 17.

In some embodiments it is contemplated that modified link lever 30, or an equivalent replacement base part will be used as a separate base part which accepts shaft 34 through a cylindrical walled opening similar to how the original unmodified link level 30 mounts to shaft 34 (e.g. similar to bolt 1821).

Single closing fork arm: While the closing forks 1701, 1801 both show two forked arms, it is contemplated that a closing fork having one arm can be used to provide a hitless control of an adjustable exhaust port 2-stroke motorcycle engine as described in the Application. In embodiments having only one forked arm, it is unimportant where the fork arm is located, only there be a corresponding post 81 or equivalent structure or flat surface on center valve assembly 8.

Figure 19:
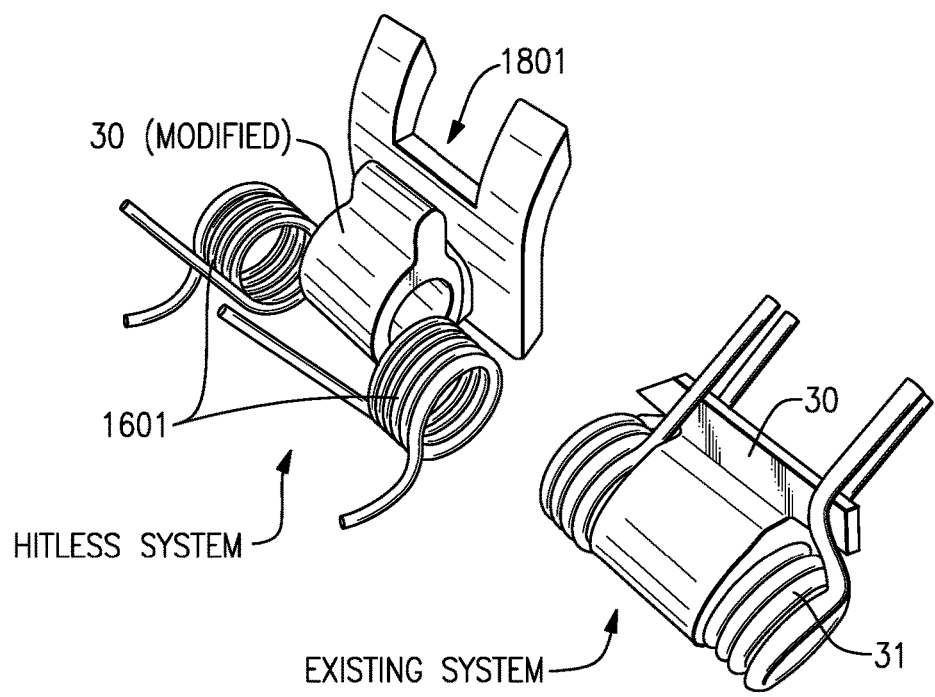
FIG. 19 shows a comparison of the new upgrade torsion springs to the original torsion springs and the new closing fork to the original link lever.

FIG. 19 shows a comparison of the new upgrade torsion springs 1601 to the original torsion springs 31 and the new closing fork to the original link lever 30;

Opening the valves according to the new system: FIG. 20A, FIG. 20B, FIG. 20C show shaft 34 rotating from all valves closed to all valves open. FIG. 20A shows shaft 34 rotated to the all valves closed position. Closing fork 1801 holds valve assembly 8 closed by pressing against transvers posts 81 of valve assembly 8 to overcome the open spring bias of spring 1601. FIG. 20B shows shaft 34 rotated so that the forked arms 1803 of closing fork 1801 have rotated up allowing the center valve assembly to open by the open bias of spring 1601. FIG. 20C shows shaft 34 further rotated to the all valves open position. The operation of side valves 12 is unchanged by spring 1601 and closing fork 1801 modification.

During the valve closed to open progression as described above, the governor 505 slowly allows the main center valve (valve assembly 8) to open until it hits its stop (returning to its full open position halfway through the control rod rotation). The control rod (shaft 34) continues rotating, operating the second stage (side valves) in the second half of control rod rotation with no resistance on the control rod caused by any of the valves or their connections.

Closing the valves according to the new system: FIG. 21A, FIG. 21B, FIG. 21C show shaft 34 rotating from all valves open to all valves closed. In FIG. 21A, shaft 34 is shown in the all valve open rotational position. In FIG. 21B, shaft 34 has rotated to the center valve (valve assembly 8) open position and where both side valves 12 are in a closed position. The forked arms 1803 of closing fork 1801 can be seen near or at the transverse posts 81 of valve assembly 8. In FIG. 21C, shaft 34 has rotated to the all valve closed rotational position, and the forked arms 1803 of closing fork 1801 are pressing against the transverse posts of valve assembly 8 to hold the center valve assembly closed.

Figure 22:
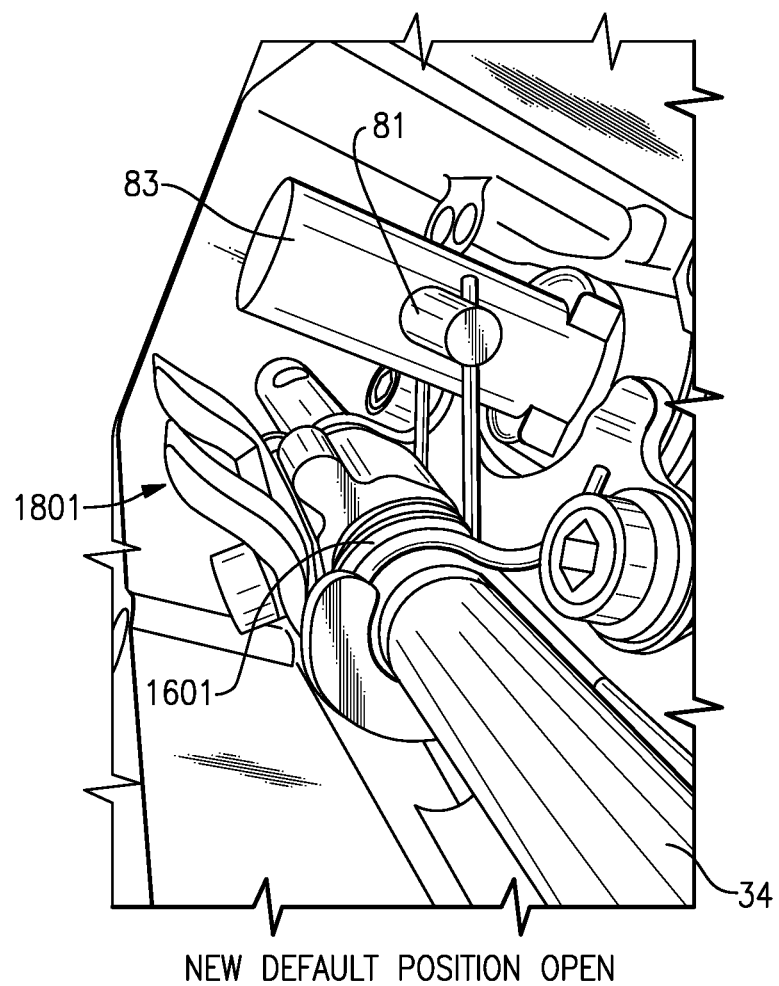
FIG. 22 is a drawings showing the new default open position of the center power valve assembly.

FIG. 22 is a drawings showing the new default open position of the center power valve assembly 8.

During the closing of the valves, the governor pulls the second stage (side valves) closed (at half rotation), then closes the main center valve with the new closing fork. When the linkage is disconnected from the control rod, the default position is all valves open, the opposite of the original system.

Once modified as described hereinabove, the governor is allowed to move the control rod and power valves smoothly without any interference to the governors' linear design. Testing showed this lack of interference caused the YPVS™ timing to be a little early, so a new spring with a stronger rate was installed in the governor to correct the timing. The new governor spring is matched for perfect high RPM performance while increasing low RPM performance because of the stronger rate.

The new system as described hereinabove makes the engine output smooth and linear through the entire RPM range with no "HIT". Following installation of the spring 1601 and closing fork (e.g. closing fork 1801 or 1701), there is also an increase of torque in the lower RPM range. The motorcycle engine power valve upgrade kit is believed to work with all types of YPVS™ system main center valves, new style, old style, broken or not from 1999 to the current model year.

Example of a new closing fork and open spring bias of a center power valve for a hitless control of an adjustable exhaust port 2-stroke motorcycle engine: Reference designators are given for both closing fork versions 1701 (e.g. FIG. 17) and 1801 (e.g. FIG. 18) of the new hitless closing fork. The hitless control adjustable exhaust port 2-stroke motorcycle engine closing fork 1701, 1801 includes a flat plate 1702, 1802 which extends in a same direction into two substantially parallel flat closing fork arms 1703, 1803. The flat plate 1702, 1802 includes a flat plate interior cylindrical wall which extends perpendicular from a first flat plate surface to a second flat plate surface to define a mounting hole 1711, 1811 which accepts a mounting bolt 1821. A closing fork base section 1705, modified 30, has a mounting internal cylindrical wall in alignment with and to extend the interior flat plate cylindrical wall to allow the mounting bolt 1821 to extend through the closing fork base section to bolt the hitless control adjustable exhaust port 2-stroke motor-cycle engine closing fork to a shaft 34. An internal closing fork base section cylindrical wall 1707 is perpendicular to both the interior cylindrical wall and a direction of the substantially parallel flat closing fork arms to accept the shaft 34 inserted there through. Each torsion spring 1601 of two torsion springs has a first extended leg including an approximately 90-degree bend about where the first extended leg extends out from a spring body of each torsion spring and a second leg extending straight out of a body of each torsion spring. Each of the torsion springs 1601 is a mirror of each other where the first extended leg extends from a different side. The two torsion springs 1601 define a cylindrical opening which mounts freely and rotatingly over a shaft 34 on either side of the closing fork base section.

Figure 23:
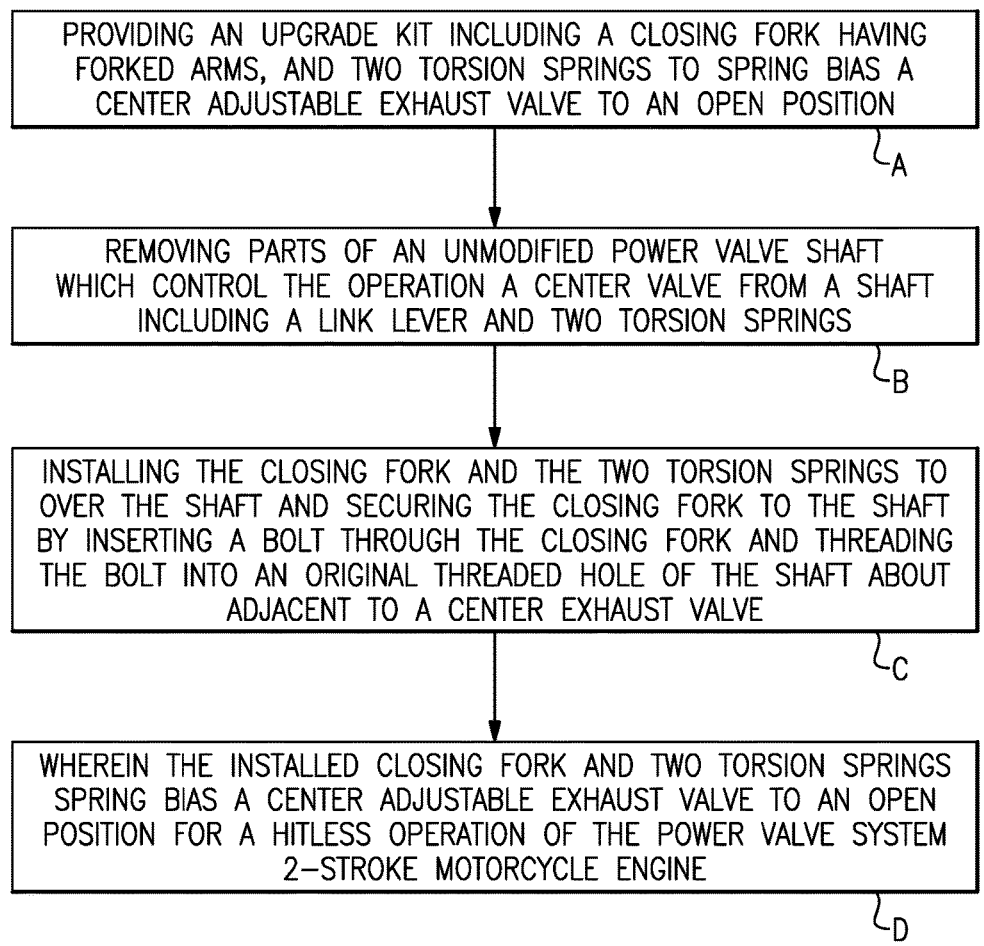
FIG. 23 shows a flow diagram for a hitless PVS upgrade.

FIG. 23 shows a flow diagram for a hitless PVS upgrade as described hereinabove. The method steps include: A) providing an upgrade kit including a closing fork having forked arms, and two torsion springs to spring bias a center adjustable exhaust valve to an open position; B) removing parts of an unmodified power valve shaft which control the operation a center valve from a shaft including a link lever and two torsion springs; C) installing the closing fork and the two torsion springs to over the shaft and securing the closing fork to the shaft by inserting a bolt through the closing fork and threading the bolt into an original threaded hole of the shaft about adjacent to a center exhaust valve; and D) wherein the installed closing fork and two torsion springs spring bias a center adjustable exhaust valve to an open position for a hitless operation of the power valve system 2-stroke motorcycle engine Exemplary upgrade kits: In one exemplary embodiment, a power valve system (PVS) upgrade kit for the YZ250 Motorcycle includes a closing fork (either a two-piece closing fork with a separate closing fork base portion, or a one-piece closing fork which includes an integral base portion) and two tension springs which spring bias the center valve to an open position as described hereinabove, which parts solve the "HIT" problem. There could also be supplied governor compression springs with different rates (spring constants) and an assortment of different thickness washer plates. There can also be different length pieces of plastic tube to slide over the governor shaft to control the range of motion inside the governor and to limit the amount the side exhaust valves open. There can also be included a small bushing that can be used for shaft 34 as a repair for those who have a worn cylinder shaft hole.

In summary, a new hitless power valve system (PVS) upgrade kit and upgrade method with closing fork system and reversed spring bias is described hereinabove, which solves the HIT problem of hesitation and surging during power throttle changes.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:
1. An adjustable exhaust port 2-stroke motorcycle engine for spring biasing open a center adjustable exhaust valve by torsion springs comprising:
 a closing fork having fork arms extending from a base portion of said closing fork, said base portion screwed or bolted to an adjustable exhaust port control rod adjacent to the center adjustable exhaust valve having a pair of transverse posts;

two torsion springs slidably mounted over said adjustable exhaust port control rod on either side of said closing fork base portion, each of said two torsion springs disposed freely and rotatingly over said adjustable exhaust port control rod on either side of said closing fork base portion, and each of said two torsion springs having a first extended leg stopped by and in contact with a surface of an engine cylinder and a second leg stopped by and in contact with a respective one of said pair of transverse posts of said center adjustable exhaust valve, said center adjustable exhaust valve spring biased to a center valve open position by said two torsion springs; and wherein on rotation of said adjustable exhaust port control rod said fork arms of said closing fork come into contact with said pair of transverse posts while said center adjustable exhaust valve remains spring biased open, and said fork arms of said closing fork overcome said open spring bias to close said center adjustable exhaust valve.

2. The adjustable exhaust port 2-stroke motorcycle engine of claim 1, wherein each of said first extended legs comprises an approximately 90-degree bend about where said first extended leg extends out from a spring body of each torsion spring, and wherein each of said second legs extends straight out of the spring body of each torsion spring.

3. The adjustable exhaust port 2-stroke motorcycle engine of claim 1, wherein said center adjustable exhaust valve comprises a power valve.

4. The adjustable exhaust port 2-stroke motorcycle engine of claim 1, wherein said 2-stroke motorcycle engine is disposed in a YZ250 series motorcycle.

5. The adjustable exhaust port 2-stroke motorcycle engine of claim 1, wherein said 2-stroke motorcycle engine further comprises two additional side valves operated by said adjustable exhaust port control rod.

6. The adjustable exhaust port 2-stroke motorcycle engine of claim 1, wherein said center adjustable exhaust valve is independently spring biased to the center valve open position at all times.

7. An adjustable exhaust port 2-stroke motorcycle engine with a center adjustable exhaust valve independently spring biased open at all times comprising:

a closing fork having fork arms extending from a base portion of said closing fork, said closing fork having a closing fork base portion screwed or bolted to an adjustable exhaust port control rod shaft adjacent to the center adjustable exhaust valve having a pair of transverse posts;

two torsion springs, each of said torsion springs having a first extended leg comprising an approximately 90-degree bend about where said first extended leg extends out from a spring body of each torsion spring and a second leg extending straight out of the spring body of each torsion spring, each of said torsion springs a mirror of each other where the first extended leg extends from a different side, said two torsion springs defining a cylindrical opening which slides freely and rotatingly over the adjustable exhaust port control rod shaft, each of said torsion springs disposed on either side of said closing fork base portion, and each of said two torsion springs having the first extended leg stopped by and in contact with a surface of an engine cylinder and the second leg stopped by and in contact with a respective one of said pair of transverse posts of said center adjustable exhaust valve, said center adjustable exhaust valve spring biased to a center valve open position at all times by said two torsion springs, said pair of transverse posts of the center adjustable exhaust valve engaged by said fork arms upon rotation of said adjustable exhaust port control rod shaft, said center adjustable exhaust valve closed by overcoming an open spring bias provided by said two torsion springs.

* * * * *